US011905736B1

(12) United States Patent

Espinosa-Ulloa

(10) Patent No.: US 11,905,736 B1

(45) Date of Patent: Feb. 20, 2024

(54) LOCK WITH KEY HAVING EXTENDING ARM ELEMENTS

(71) Applicant: Daniel Espinosa-Ulloa, San Bernardino, CA (US)

(72) Inventor: Daniel Espinosa-Ulloa, San Bernardino, CA (US)

( * ) Notice: Subject to any disclaimer, the term of this patent is extended or adjusted under 35 U.S.C. 154(b) by 386 days.

(21) Appl. No.: 17/202,428

(22) Filed: Mar. 16, 2021

(51) Int. Cl.

| | |
|---|---|
| ***E05B 35/00*** | (2006.01) |
| ***E05B 19/00*** | (2006.01) |
| ***E05B 67/04*** | (2006.01) |
| ***E05B 49/00*** | (2006.01) |
| ***E05B 19/14*** | (2006.01) |

(52) U.S. Cl.

CPC .......... *E05B 35/004* (2013.01); *E05B 19/007* (2013.01); *E05B 19/0052* (2013.01); *E05B 19/14* (2013.01); *E05B 49/002* (2013.01); *E05B 49/004* (2013.01); *E05B 67/04* (2013.01)

(58) Field of Classification Search

CPC ............. E05B 19/0052; E05B 19/0058; E05B 19/0064; E05B 19/007; E05B 19/14; E05B 35/003; E05B 35/004; E05B 35/14; E05B 49/002; E05B 49/004; E05B 67/04

See application file for complete search history.

(56) References Cited

U.S. PATENT DOCUMENTS 507,408 A * 10/1893 Bole ..................... E05B 35/004 70/399
1,464,194 A * 8/1923 Bartolacelli .......... E05B 35/004 70/38 A
1,482,249 A * 1/1924 Pagliuco ............... E05B 35/004 70/399
1,692,878 A * 11/1928 Watts .................... E05B 49/004 200/61.66
1,750,542 A * 3/1930 Pucek ................... E05B 35/004 70/355
3,765,199 A 10/1973 Wiczer
4,104,490 A * 8/1978 Lundstrom ........... E05B 49/004 200/61.61
4,429,554 A * 2/1984 Litvin ................. E05B 19/0035 70/358
5,170,651 A * 12/1992 Errani ................... E05B 35/004 70/395
5,691,711 A * 11/1997 Jorgensen ............. E05B 49/002 340/5.67

(Continued)

FOREIGN PATENT DOCUMENTS

DE 102005046127 4/2007

*Primary Examiner* — Christopher J Boswell

(74) *Attorney, Agent, or Firm* — Kyle A. Fletcher, Esq.

(57) ABSTRACT

The lock with key having expanding arm elements is an electromechanical lock mechanism. The lock with key having expanding arm elements comprises a key structure, a lock structure, and a lock control circuit. The lock structure is a fastening device. The lock structure secures the position of a first object relative to a second object. The lock structure is a releasable structure such that the position of the first object relative to the second object can be adjusted after the lock structure is released. The lock control circuit is an electric circuit. The lock control circuit forms an electronic locking mechanism that fastens and releases the locking structure. The key structure is a multi-blade structure that controls the operation of the lock control circuit.

18 Claims, 10 Drawing Sheets

(56) References Cited

U.S. PATENT DOCUMENTS

| | | | | |
|---|---|---|---|---|
| 5,724,841 | A * | 3/1998 | Botteon | E05B 35/004<br>70/395 |
| 7,941,934 | B2 * | 5/2011 | Gerner | E05B 47/063<br>340/5.61 |
| 8,482,411 | B1 | 7/2013 | Brown | |
| 9,115,511 | B1 | 8/2015 | Schmidt | |
| 9,512,641 | B2 | 12/2016 | Delande | |
| 9,663,975 | B2 | 5/2017 | Castro | |
| 10,119,300 | B2 * | 11/2018 | Yeh | E05B 45/06 |
| D902,008 | S | 11/2020 | Fan | |
| 2004/0148989 | A1 | 8/2004 | Hsieh | |
| 2006/0272372 | A1 * | 12/2006 | Talamonti | E05B 35/004<br>70/358 |
| 2010/0326149 | A1 | 12/2010 | Chang | |

* cited by examiner

LOCK WITH KEY HAVING EXTENDING ARM ELEMENTS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of locks including guards for locks. (E05B17/14)

SUMMARY OF INVENTION

The lock with key having expanding arm elements is an electromechanical lock mechanism. The lock with key having expanding arm elements comprises a key structure, a lock structure, and a lock control circuit. The lock structure is a fastening device. The lock structure secures the position of a first object relative to a second object. The lock structure is a releasable structure such that the position of the first object relative to the second object can be adjusted after the lock structure is released. The lock control circuit is an electric circuit. The lock control circuit forms an electronic locking mechanism that fastens and releases the locking structure. The key structure is a multi-blade structure that controls the operation of the lock control circuit.

These together with additional objects, features and advantages of the lock with key having expanding arm elements will be readily apparent to those of ordinary skill in the art upon reading the following detailed description of the presently preferred, but nonetheless illustrative, embodiments when taken in conjunction with the accompanying drawings.

In this respect, before explaining the current embodiments of the lock with key having expanding arm elements in detail, it is to be understood that the lock with key having expanding arm elements is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the lock with key having expanding arm elements.

It is therefore important that the claims be regarded as including such equivalent construction insofar as they do not depart from the spirit and scope of the lock with key having expanding arm elements. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
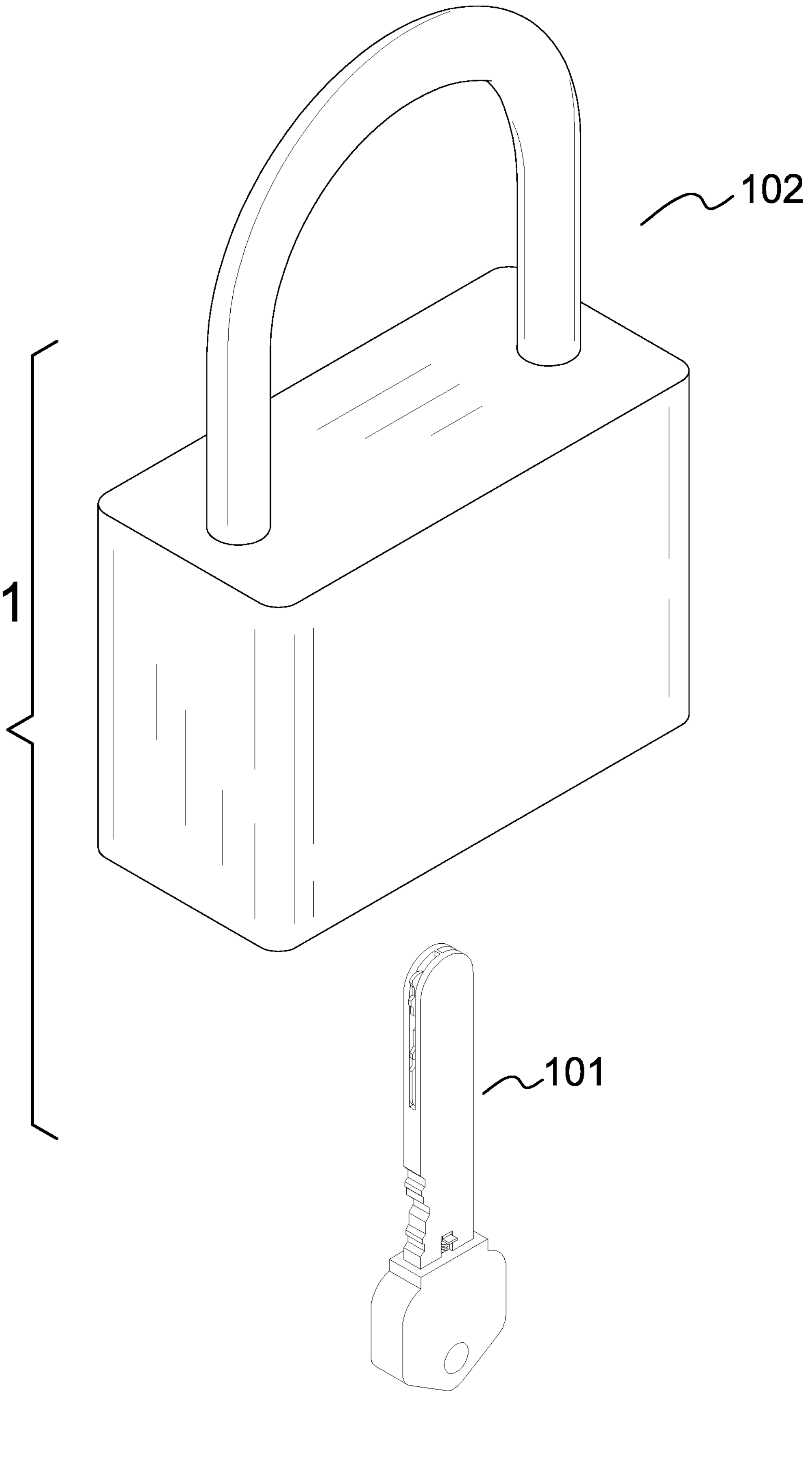
FIG. 1 is a perspective view of an embodiment of the disclosure.
Figure 2:
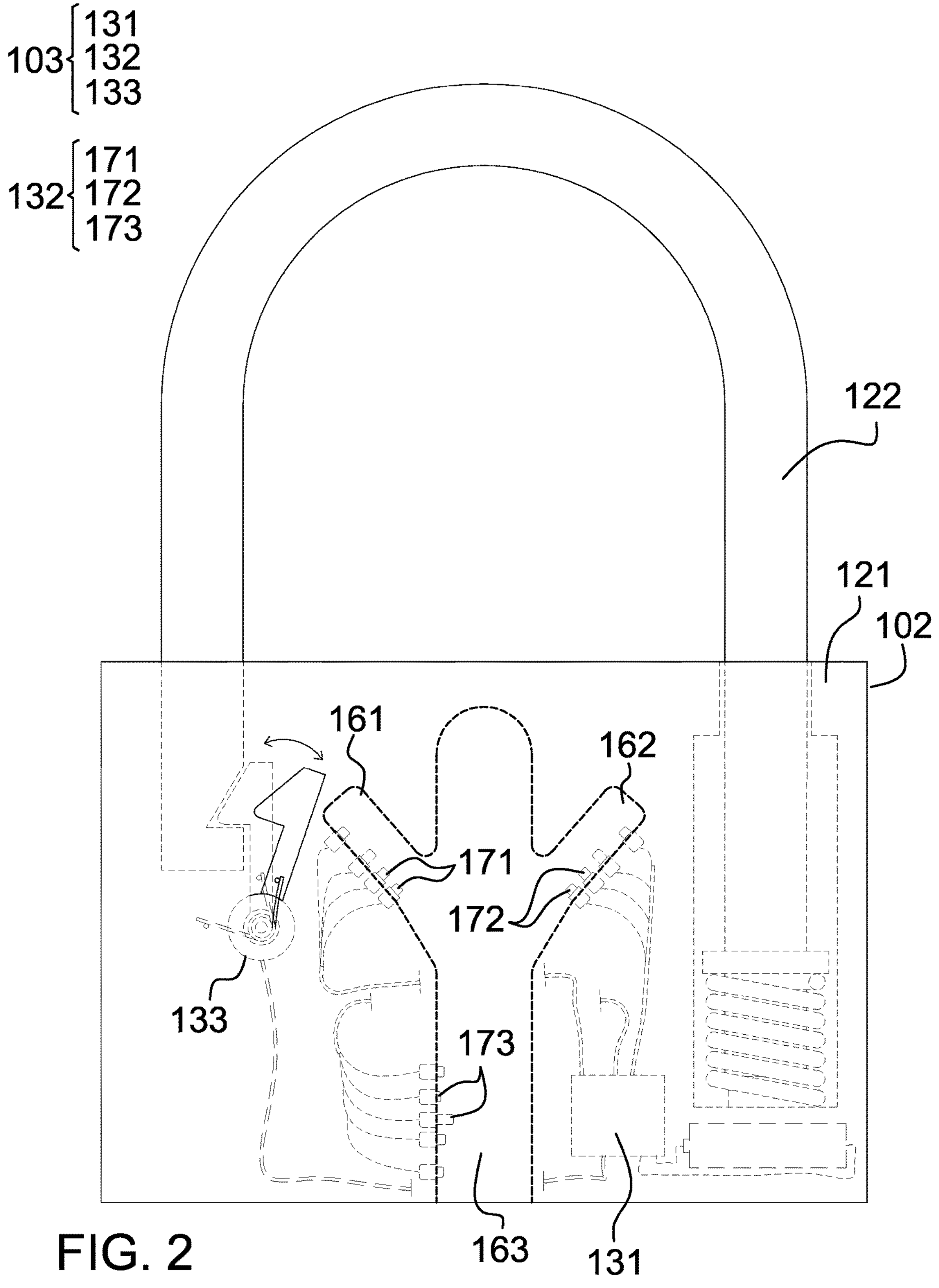
FIG. 2 is a front view of an embodiment of the disclosure.
Figure 3:
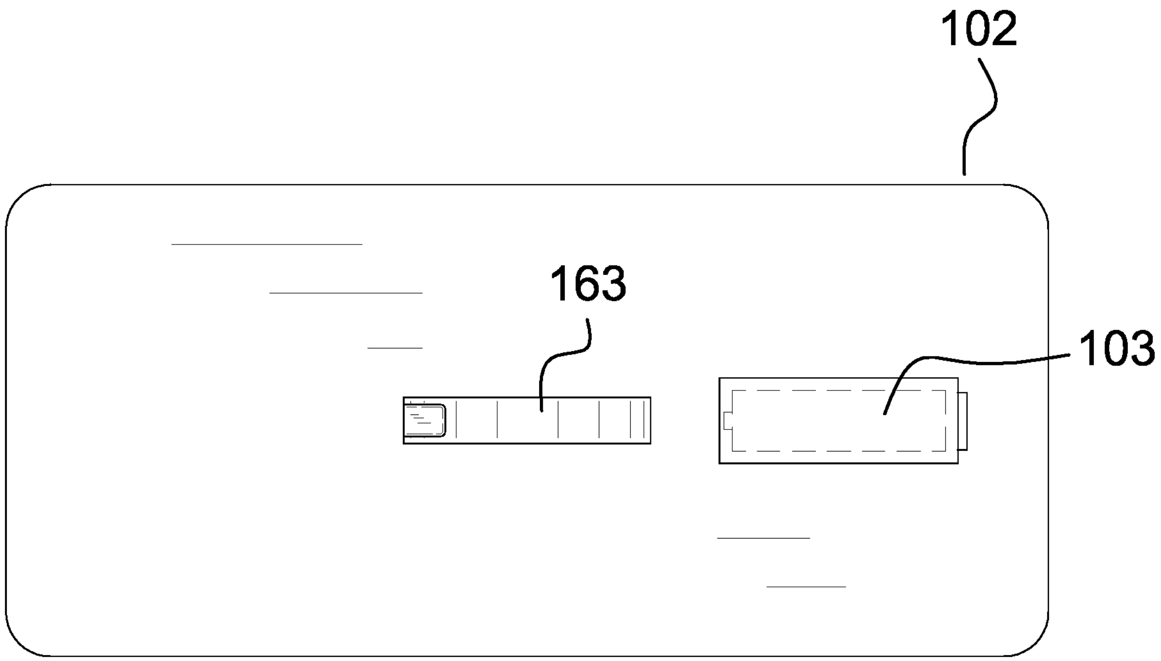
FIG. 3 is a bottom view of an embodiment of the disclosure.
Figure 4:
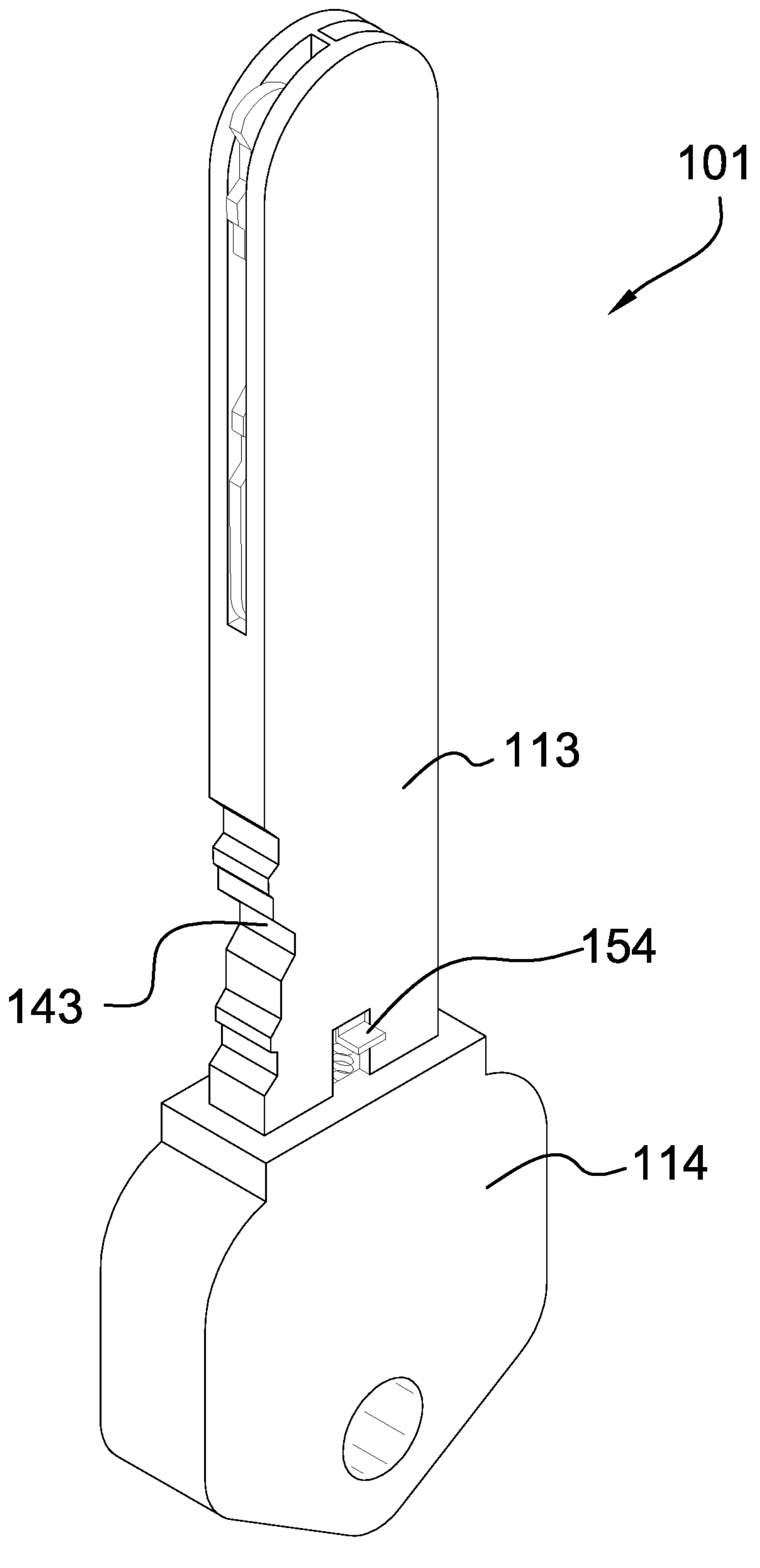
FIG. 4 is a detail view of an embodiment of the disclosure.
Figure 5:
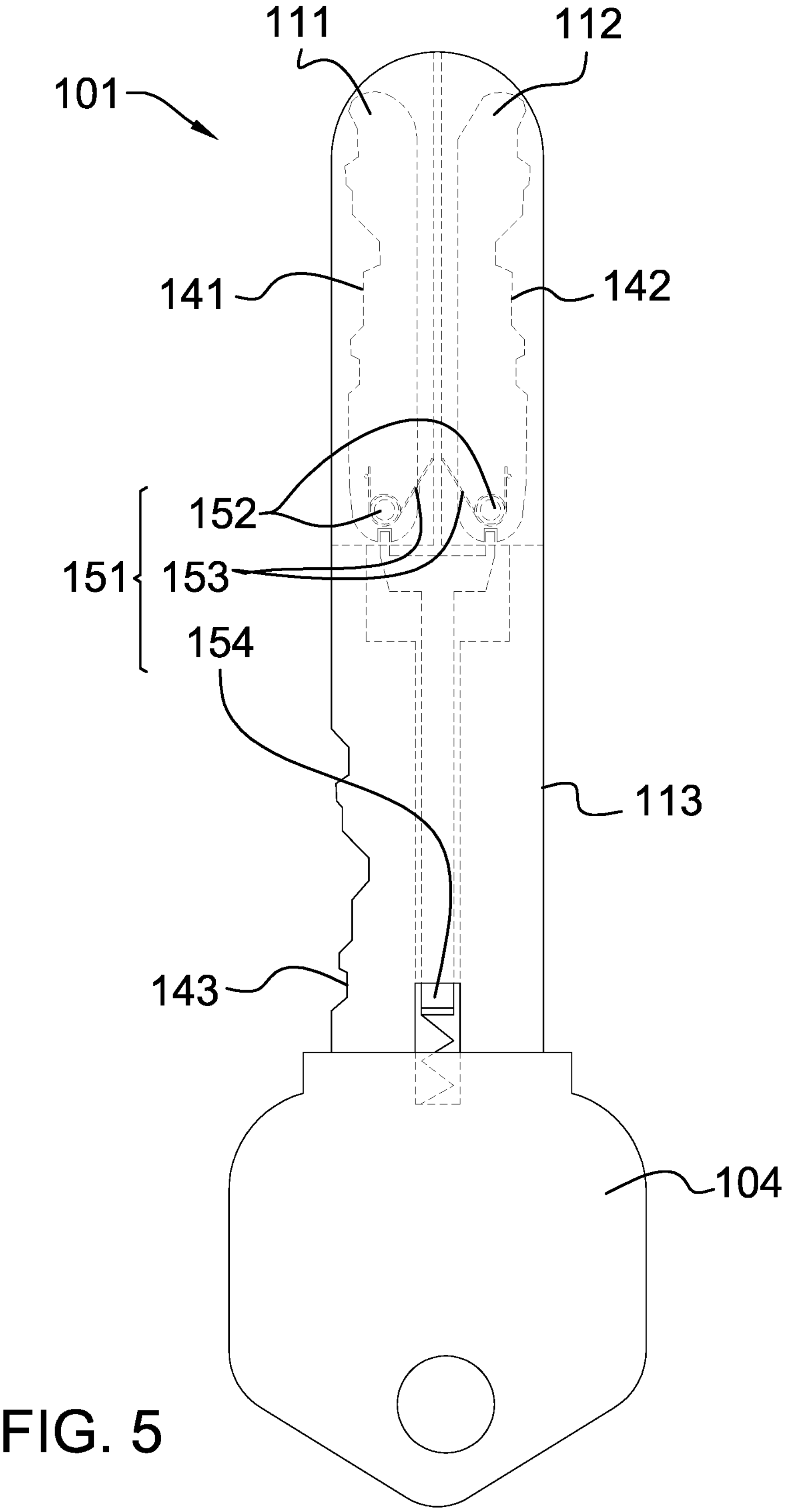
FIG. 5 is a detail view of an embodiment of the disclosure.
Figure 6:
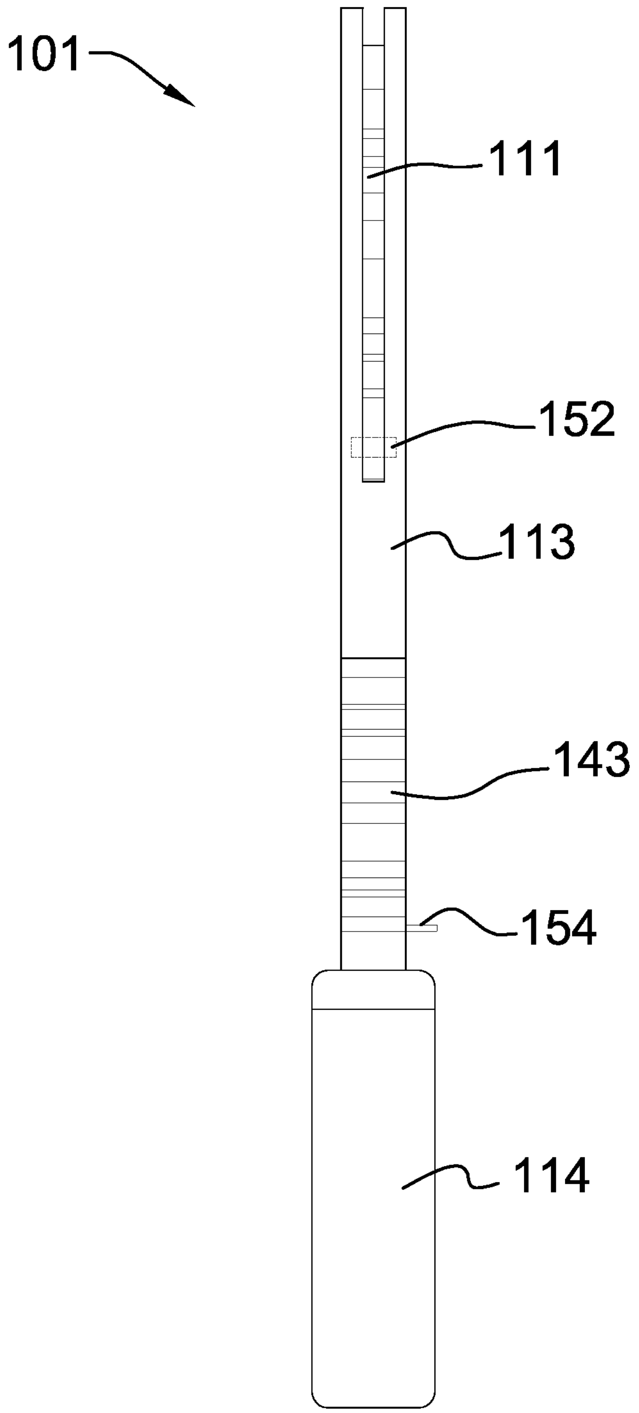
FIG. 6 is a detail view of an embodiment of the disclosure.
Figure 7:
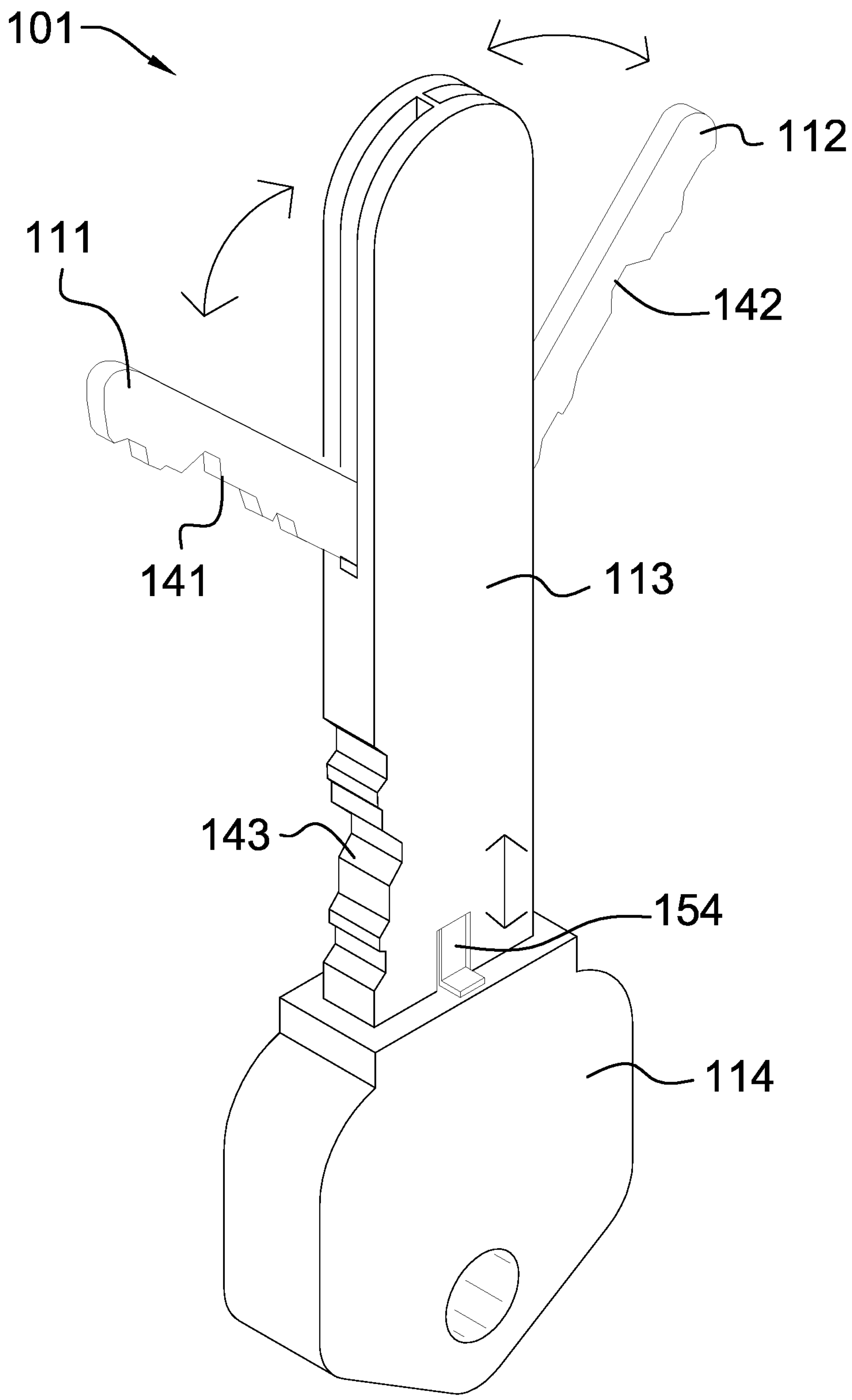
FIG. 7 is a detail view of an embodiment of the disclosure.
Figure 8:
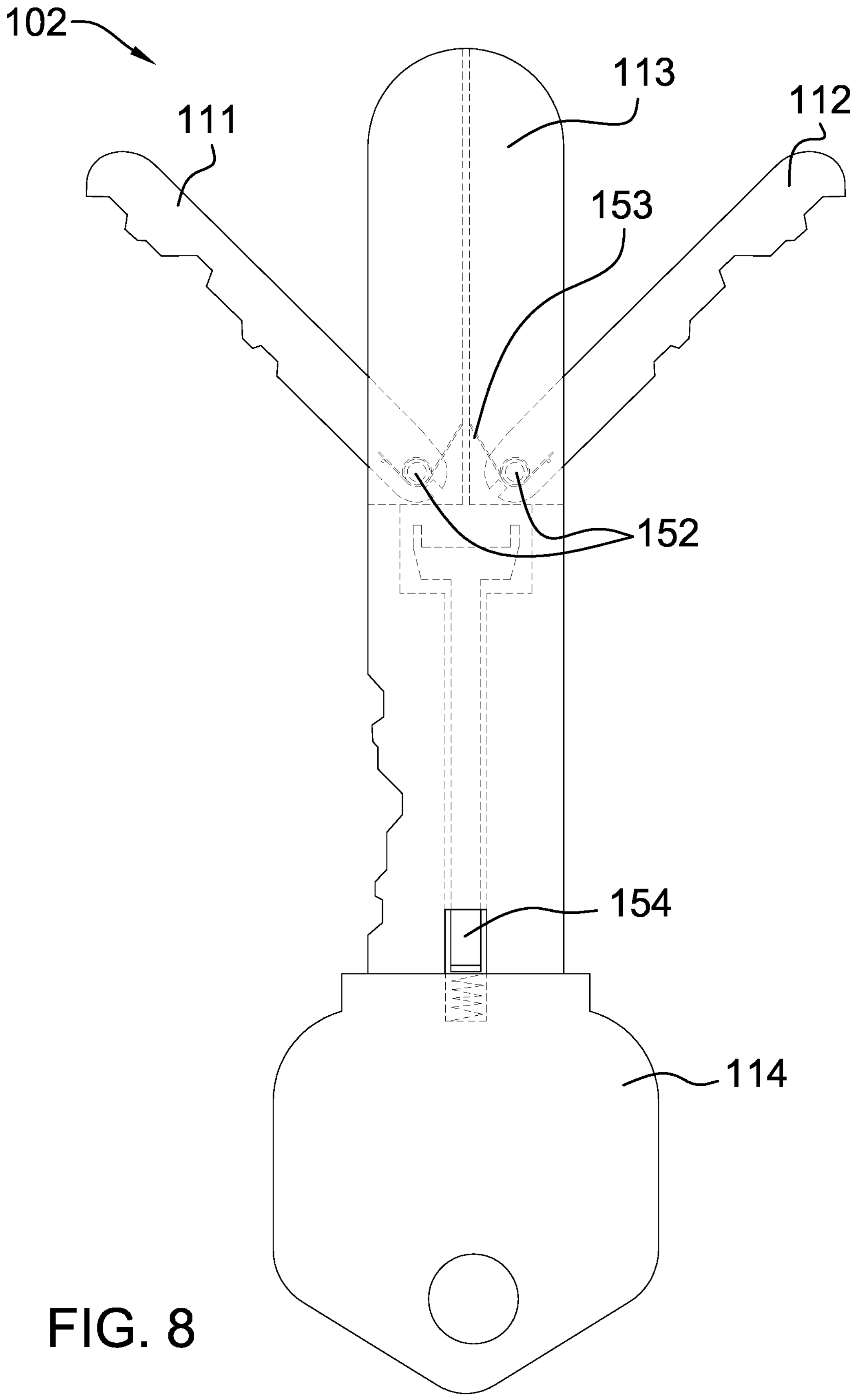
FIG. 8 is a detail view of an embodiment of the disclosure.
Figure 9:
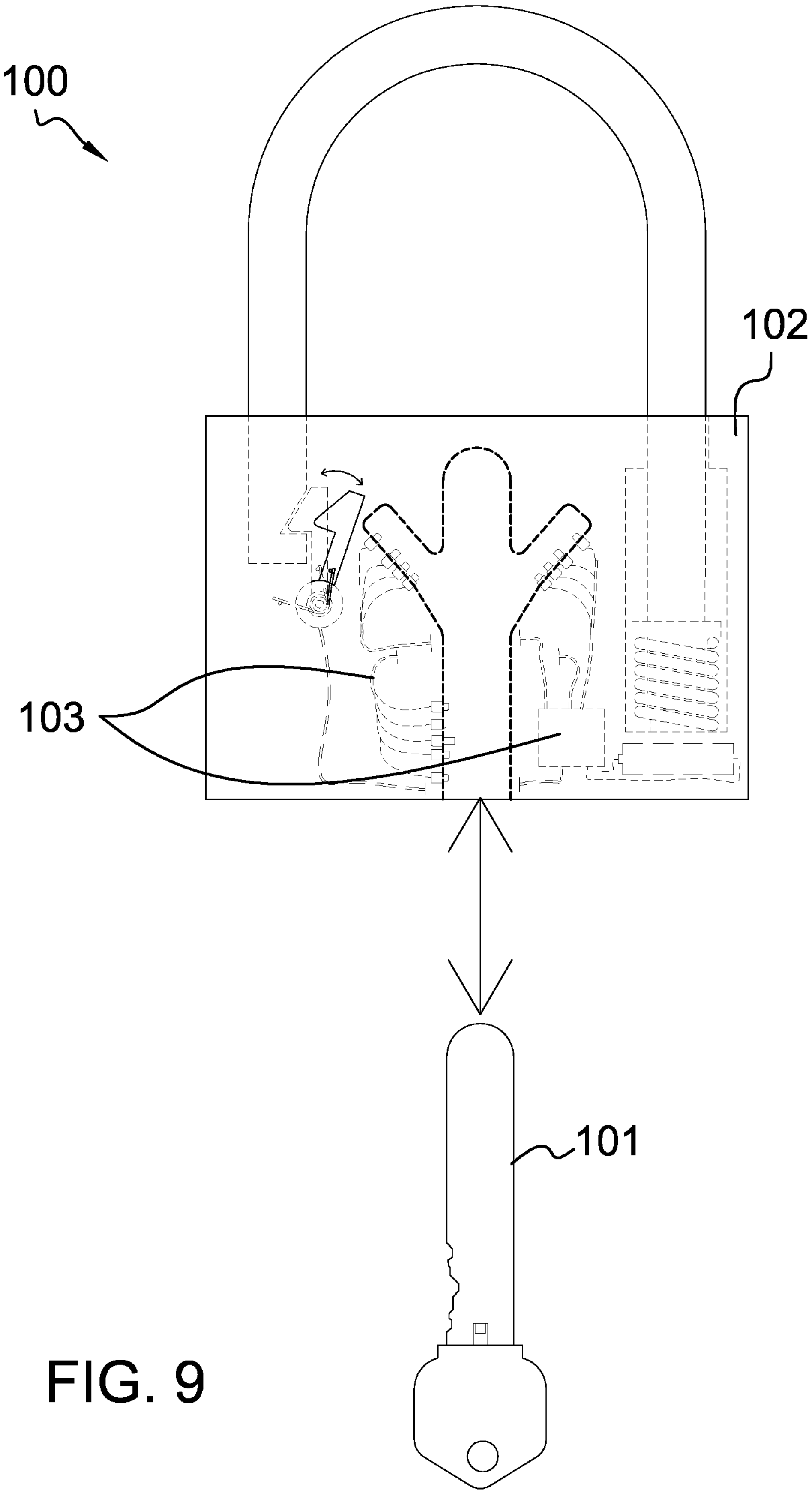
FIG. 9 is an in-use view of an embodiment of the disclosure.
Figure 10:
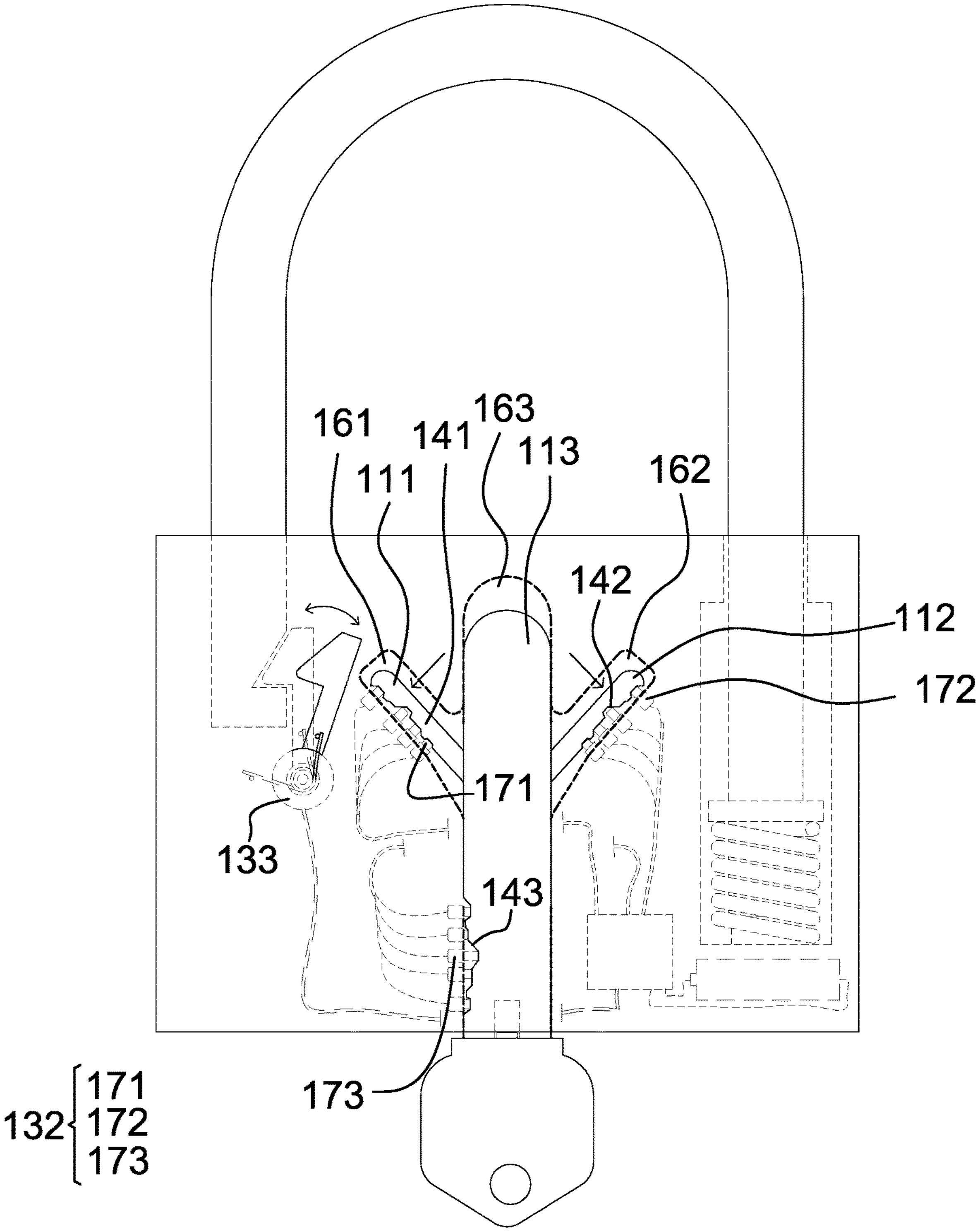
FIG. 10 is an in-use view of an embodiment of the disclosure.

Detailed reference will now be made to one or more potential embodiments of the disclosure, which are illustrated in FIGS. 1 through 10.

The lock with key having expanding arm elements 100 (hereinafter invention) is an electromechanical lock mechanism. The invention 100 comprises a key structure 101, a locking structure 102, and a lock control circuit 103. The locking structure 102 is a fastening device. The locking structure 102 secures the position of a first object relative to a second object. The locking structure 102 is a releasable structure such that the position of the first object relative to the second object can be adjusted after the locking structure 102 is released. The lock control circuit 103 is an electric circuit. The lock control circuit 103 forms an electronic locking mechanism that fastens and releases the locking structure 102. The key structure 101 is a multi-blade structure that controls the operation of the lock control circuit 103.

The key structure 101 is a mechanical structure. The key structure 101 controls the operation of the lock control circuit 103. The key structure 101 inserts into the locking structure 102. The key structure 101 is a multi-blade structure.

The key structure 101 is a rotating structure. By rotating structure is meant that the cant formed between any two blades selected from the multi-blade structure of the key structure 101 is adjustable. By cant is meant the arc formed between the major axis of any blade initially selected from the multi-blade structure of the key structure 101 and the major axis of any blade subsequently selected from the multi-blade structure of the key structure 101. The locking structure 102 is constructed such that the rotation of the multi-blade structure occurs while the key structure 101 is inserted in the locking structure 102.

Each blade selected from the multi-blade structure of the key structure 101 is a toothed structure. By toothed structure is meant that each blade selected from the multi-blade structure is formed with a series of ridges and grooves that are individualized to the selected blade. The toothed structure of each blade selected from the multi-blade structure interacts with the lock control circuit 103 in a manner that is similar to the way a traditional lock key interacts with the tumblers of a traditional lock. The lock control circuit 103 simultaneously measures the toothed structure of each blade selected from the multi-blade structure of the key structure 101 to identify whether the key structure 101 is authorized to release the locking structure 102.

Unlike a traditional lock and key combination, the key structure 101 itself does not rotate within the locking structure 102 to operate the lock control circuit 103.

The key structure 101 comprises a first arm blade 111, a second arm blade 112, a master blade 113, and a key bow 114.

The key bow 114 is a grip that attaches to the lateral face of the master blade 113. The key bow 114 forms a handle used to insert and remove the key structure 101 into and out of the locking structure 102.

The first arm blade 111 forms a first blade of the multi-blade structure of the key structure 101. The first arm blade 111 is a disk-shaped structure. The first arm blade 111 attaches to the master blade 113 such that the first arm blade 111 rotates relative to the master blade 113. The first arm blade 111 further comprises a first arm blade 111 toothed structure 141.

The first arm blade 111 toothed structure 141 is series of ridges and grooves that are formed in the lateral face of the disk structure of the first arm blade 111. The specific structure of the ridges and grooves that form the first arm blade 111 toothed structure 141 are individualized to the first arm blade 111 such that the structure of the first arm blade 111 toothed structure 141 is different from the structure of the second arm blade 112 toothed structure 142. The specific structure of the ridges and grooves that form the first arm blade 111 toothed structure 141 are individualized to the first arm blade 111 such that the structure of the first arm blade 111 toothed structure 141 is different from the structure of the master blade 113 toothed structure 143.

The specific structure of the ridges and grooves that form the first arm blade 111 toothed structure 141 are individualized to the first arm blade 111 such that the structure of the first arm blade 111 toothed structure 141 of any first instantiation of the key structure 101 is different from the specific structure of the ridges and grooves that form the first arm blade 111 toothed structure 141 of any second instantiation of the key structure 101.

The second arm blade 112 forms a second blade of the multi-blade structure of the key structure 101. The second arm blade 112 is a disk-shaped structure. The second arm blade 112 attaches to the master blade 113 such that the second arm blade 112 rotates relative to the master blade 113. The second arm blade 112 attaches to the master blade 113 such that the second arm blade 112 rotates relative to the first arm blade 111. The second arm blade 112 further comprises a second arm blade 112 toothed structure 142.

The second arm blade 112 toothed structure 142 is series of ridges and grooves that are formed in the lateral face of the disk structure of the second arm blade 112. The specific structure of the ridges and grooves that form the second arm blade 112 toothed structure 142 are individualized to the second arm blade 112 such that the structure of the second arm blade 112 toothed structure 142 is different from the structure of the first arm blade 111 toothed structure 141. The specific structure of the ridges and grooves that form the second arm blade 112 toothed structure 142 are individualized to the second arm blade 112 such that the structure of the second arm blade 112 toothed structure 142 is different from the structure of the master blade 113 toothed structure 143.

The specific structure of the ridges and grooves that form the second arm blade 112 toothed structure 142 are individualized to the second arm blade 112 such that the structure of the second arm blade 112 toothed structure 142 of any first instantiation of the key structure 101 is different from the specific structure of the ridges and grooves that form the second arm blade 112 toothed structure 142 of any second instantiation of the key structure 101.

The master blade 113 forms a third blade of the multi-blade structure of the key structure 101. The master blade 113 is a disk-shaped structure. The master blade 113 attaches to the first arm blade 111 such that the first arm blade 111 rotates relative to the master blade 113. The master blade 113 attaches to the second arm blade 112 such that the second arm blade 112 rotates relative to the master blade 113.

The master blade 113 forms a hollow storage structure that contains the first arm blade 111 and the second arm blade 112. The first arm blade 111 and the second arm blade 112 are rotated into the hollow storage structure of the master blade 113 as the master blade 113 of the key structure 101 inserts into the locking structure 102. The master blade 113 interacts with the lock control circuit 103 once the master blade 113 is fully inserted into the locking structure 102.

The first arm blade 111 rotates away from the master blade 113 after the master blade 113 is fully inserted into the locking structure 102. The first arm blade 111 rotates away from the master blade 113 into a position that allows the first arm blade 111 to interact with the lock control circuit 103.

The second arm blade 112 rotates away from the master blade 113 after the master blade 113 is fully inserted into the locking structure 102. The second arm blade 112 rotates away from the master blade 113 into a position that allows the second arm blade 112 to interact with the lock control circuit 103. The second arm blade 112 rotates away from the master blade 113 in the direction opposite to the direction of rotation of the first arm blade 111. By the direction opposite to the direction of rotation of the first arm blade 111 is meant that: a) second arm blade 112 will rotate in the counterclockwise direction if the first arm blade 111 rotates in the clockwise direction; and, b) the second arm blade 112 will rotate in the clockwise direction if the first arm blade 111 rotates in the counterclockwise direction.

The first arm blade 111 rotates back into the hollow storage structure of the master blade 113 as the key structure 101 is removed from the locking structure 102. The second arm blade 112 rotates back into the hollow storage structure of the master blade 113 as the key structure 101 is removed from the locking structure 102.

The master blade 113 further comprises a master blade 113 toothed structure 143 and a hinge 152 structure 151.

The master blade 113 toothed structure 143 is series of ridges and grooves that are formed in the lateral face of the disk structure of the master blade 113. The specific structure of the ridges and grooves that form the master blade 113 toothed structure 143 are individualized to the master blade 113 such that the structure of the master blade 113 toothed structure 143 is different from the structure of the first arm blade 111 toothed structure 141. The specific structure of the ridges and grooves that form the master blade 113 toothed structure 143 are individualized to the master blade 113 such that the structure of the master blade 113 toothed structure 143 is different from the structure of the second arm blade 112 toothed structure 142.

The specific structure of the ridges and grooves that form the master blade 113 toothed structure 143 are individualized to the master blade 113 such that the structure of the master blade 113 toothed structure 143 of any first instantiation of the key structure 101 is different from the specific structure of the ridges and grooves that form the master blade 113 toothed structure 143 of any second instantiation of the key structure 101.

The hinge 152 structure 151 is a mechanical structure.

The hinge 152 structure 151 attaches the first arm blade 111 to the master blade 113 such that the first arm blade 111 rotates relative to the master blade 113. The hinge 152 structure 151 latches the first arm blade 111 into a position within the hollow storage structure of the master blade 113. The hinge 152 structure 151 releases the first arm blade 111 from its position in the hollow interior of the master blade 113 such that the hinge 152 structure 151 can rotate into the first arm blade 111 slot 161 after the key structure 101 is fully inserted into the locking structure 102. The walls of the master blade 113 slot 163 press against the first arm blade 111 as the key structure 101 is removed from the locking structure 102 such that the first arm blade 111 is reinserted into the hollow storage structure of the master blade 113. The hinge 152 structure 151 relatches the first arm blade 111 into position after the first arm blade 111 is reinserted into the hollow storage structure of the master blade 113.

The hinge 152 structure 151 attaches the second arm blade 112 to the master blade 113 such that the second arm blade 112 rotates relative to the master blade 113. The hinge 152 structure 151 latches the second arm blade 112 into a position within the hollow storage structure of the master blade 113. The hinge 152 structure 151 releases the second arm blade 112 from its position in the hollow interior of the master blade 113 such that the hinge 152 structure 151 can rotate into the second arm blade 112 slot 161 after the key structure 101 is fully inserted into the locking structure 102. The walls of the master blade 113 slot 163 press against the second arm blade 112 as the key structure 101 is removed from the locking structure 102 such that the second arm blade 112 is reinserted into the hollow storage structure of the master blade 113. The hinge 152 structure 151 relatches the second arm blade 112 into position after the second arm blade 112 is reinserted into the hollow storage structure of the master blade 113.

The hinge 152 structure 151 further comprises a hinge 152, a spring mechanism 153, and a spring latch mechanism 154.

The hinge 152 is a fastening structure. The hinge 152 attaches the first arm blade 111 to the master blade 113 such that the first arm blade 111 rotates relative to the master blade 113. The hinge 152 attaches the second arm blade 112 to the master blade 113 such that the second arm blade 112 rotates relative to the master blade 113.

The spring mechanism 153 is a mechanical structure. The spring mechanism 153 attaches to the first arm blade 111 and the second arm blade 112. The spring mechanism 153 provides the motive forces that rotate the first arm blade 111 away from the master blade 113 when the key structure 101 fully inserts into the locking structure 102. The spring mechanism 153 provides the motive forces that rotate the second arm blade 112 away from the master blade 113 when the key structure 101 fully inserts into the locking structure 102.

The spring latch mechanism 154 is a mechanical structure. The spring latch mechanism 154 controls the rotation of the first arm blade 111 relative to the master blade 113. The spring latch mechanism 154 controls the rotation of the second arm blade 112 relative to the master blade 113.

The spring latch mechanism 154 locks the first arm blade 111 into a fixed position within the hollow storage structure of the master blade 113 until the key structure 101 is fully inserted into the locking structure 102. The full insertion of the key structure 101 into the locking structure 102 releases the spring latch mechanism 154 such that the first arm blade 111 rotates into the first arm blade 111 slot 161. The removal of the key structure 101 from the locking structure 102 resets the spring latch mechanism 154 such that the spring latch mechanism 154 relocks the first arm blade 111 into position within the master blade 113.

The spring latch mechanism 154 locks the second arm blade 112 into a fixed position within the hollow storage structure of the master blade 113 until the key structure 101 is fully inserted into the locking structure 102. The full insertion of the key structure 101 into the locking structure 102 releases the spring latch mechanism 154 such that the second arm blade 112 rotates into the second arm blade 112 slot 162. The removal of the key structure 101 from the locking structure 102 resets the spring latch mechanism 154 such that the spring latch mechanism 154 relocks the second arm blade 112 into position within the master blade 113.

The locking structure 102 is a fastening structure. The locking structure 102 secures a first object to a second object such that the first object remains in a fixed position relative to the second object. The locking structure 102 is a releasable structure such that the first object can subsequently move relative to the second object after the locking structure 102 has been released. The form factor of the locking structure 102 is selected such that the key structure 101: a) can insert into the locking structure 102; and, b) the rotation of the multi-blade structure of the key structure 101 can occur while the key structure 101 is inserted into the locking structure 102. The locking structure 102 comprises a lock body 121 and a bolt structure 122.

The lock body 121 is a solid rigid structure. The lock body 121 is formed with the mass necessary to allow the lock body 121 to be considered a bullet resistant structure. The lock body 121 houses the bolt structure 122 and the lock control circuit 103.

The interior of the lock body 121 is formed with a slotted structure. The slotted structure is a negative space that is formed in the lock body 121. The form factor of the slotted structure formed within in the lock body 121 allows for the insertion of the master blade 113 of the key structure 101 into the locking structure 102. The form factor of the slotted structure formed within in the lock body 121 allows for the rotation of the first arm blade 111 away from the master blade 113 after the master blade 113 is fully inserted into the locking structure 102. The form factor of the slotted structure formed within in the lock body 121 allows for the rotation of the second arm blade 112 away from the master blade 113 after the master blade 113 is fully inserted into the locking structure 102.

The lock body 121 further comprises a first arm blade 111 slot 161, a second arm blade 112 slot 162, and a master blade 113 slot 163.

The first arm blade 111 slot 161 is a negative space formed within the slotted structure of the locking structure 102. The first arm blade 111 slot 161 forms the space that the first arm blade 111 rotates into after the first arm blade 111 has been released from the master blade 113.

The second arm blade 112 slot 162 is a negative space formed within the slotted structure of the locking structure 102. The second arm blade 112 slot 162 forms the space that the second arm blade 112 rotates into after the second arm blade 112 has been released from the master blade 113. The major axis of the second arm blade 112 slot 162 forms a cant with the major axis of the first arm blade 111 slot 161 that makes the invention 100 difficult to "pick" with linear structure of the standard locksmith tools.

The master blade 113 slot 163 is a negative space formed within the slotted structure of the locking structure 102. The master blade 113 slot 163 forms the space that the master blade 113 inserts into when the key structure 101 inserts into the locking structure 102. The major axis of the master blade 113 slot 163 forms a cant with the major axis of the first arm blade 111 slot 161 that makes the invention 100 difficult to "pick" with linear structure of the standard locksmith tools. The master blade 113 slot 163 forms a cant with the major axis of the second arm blade 112 slot 162 that makes the invention 100 difficult to "pick" with linear structure of the standard locksmith tools.

The bolt structure 122 is the physical fastening device that secures the first object to the second object. The bolt structure 122 physically attaches to the first object and the second object. The bolt structure 122 fixes the position of the first object relative to the second object when the lock control circuit 103 locks the bolt structure 122 into a fixed position relative to the locking structure 102. The bolt structure 122 releases the lock on the position of the first object relative to the second object when the lock control circuit 103 releases the lock on the position of the bolt structure 122 relative to the locking structure 102.

The lock control circuit 103 mounts in the locking structure 102. The lock control circuit 103 controls the operation of the locking structure 102. By controlling the operation of the locking structure 102 is meant that: a) the lock control circuit 103 locks the locking structure 102 into a state such that the position of the first object remains fixed relative to the second object; and, b) the lock control circuit 103 releases the locking structure 102 into a state such that the first object can subsequently move relative to the second object. The lock control circuit 103 is an electric circuit. The lock control circuit 103 controls the operation of the locking structure 102. The lock control circuit 103 interacts with the toothed structure of each blade selected from the multi-blade structure of the key structure 101. The lock control circuit 103 releases the locking structure 102 when the lock control circuit 103 identifies the key structure 101 as being authorized to release the locking structure 102.

The lock control circuit 103 further comprises a logic circuit 131, a plurality of microswitches 132, and an electronic lock mechanism 133.

The logic circuit 131 is an electric circuit. The logic circuit 131 controls the operation of the locking structure 102. The logic circuit 131 monitors the locking structure 102 to determine if the key structure 101 is inserted into the locking structure 102. The logic circuit 131 identifies that the key structure 101 is authorized to release the locking structure 102. The logic circuit 131 releases the lock on the locking structure 102 when the authorized key structure 101 is fully inserted into the locking structure 102. The logic circuit 131 reestablishes the lock on the locking structure 102 when the authorized key structure 101 is removed from the locking structure 102.

The electronic lock mechanism 133 is an electric circuit. The electronic lock mechanism 133 is defined elsewhere in this disclosure. The electronic lock mechanism 133 physically controls the position of the bolt structure 122 relative to the locking structure 102. The logic circuit 131 controls the operation of the electronic lock mechanism 133. When the logic circuit 131 identifies that an authorized key is inserted into the locking structure 102, the logic circuit 131 sets the electronic lock mechanism 133 into a state that allows the bolt structure 122 to move relative to the lock body 121. When the logic circuit 131 identifies that an authorized key is not inserted into the locking structure 102, the logic circuit 131 sets the electronic lock mechanism 133 into a state that locks the bolt structure 122 into a fixed position relative to the lock body 121.

Each of the plurality of microswitches 132 is an electric switch. Each of the plurality of microswitches 132 is a momentary switch. The electric switch and the momentary switch are defined elsewhere in this disclosure. Each of the plurality of microswitches 132 mounts in the slotted structure formed in the locking structure 102. Each microswitch selected from the plurality of microswitches 132 is positioned in the slotted structure of the locking structure 102 such that each selected microswitch interacts with the toothed structure of a blade selected from the multi-blade structure of the key structure 101. Each microswitch selected from the plurality of microswitches 132 presses against the toothed structure of the blade selected from the multi-blade structure such that the movement of the selected blade past the selected microswitch moves the position of the selected microswitch such that the microswitch is actuated by the toothed structure.

The logic circuit 131 monitors the actuation of each of the plurality of microswitches 132. The specific actuations of each of the plurality of microswitches 132 by the toothed structures of the multi-blade structure (after the key structure 101 is fully inserted into the locking structure 102) is used by the lock control circuit 103 to identify that the inserted key structure 101 is authorized to release the locking structure 102.

The plurality of microswitches 132 further comprises a first sub-plurality of microswitches 171, a second sub-plurality of microswitches 172, and a third sub-plurality of microswitches 173.

The first sub-plurality of microswitches 171 is a sub-plurality of microswitches selected from the plurality of microswitches 132. The first sub-plurality of microswitches 171 mount in the first arm blade 111 slot 161 such that the first sub-plurality of microswitches 171 interacts with the first arm blade 111 toothed structure 141 of the first arm blade 111.

The second sub-plurality of microswitches 172 is a sub-plurality of microswitches selected from the plurality of microswitches 132. The second sub-plurality of microswitches 172 mount in the second arm blade 112 slot 162 such that the second sub-plurality of microswitches 172 interacts with the second arm blade 112 toothed structure 142 of the second arm blade 112.

The third sub-plurality of microswitches 173 is a sub-plurality of microswitches selected from the plurality of microswitches 132. The third sub-plurality of microswitches 173 mount in the master blade 113 slot 163 such that the third sub-plurality of microswitches 173 interacts with the master blade 113 toothed structure 143 of the master blade 113.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Angle: As used in this disclosure, an angle is a measure of a region between two intersecting lines or surfaces.

Angle of Attack: As used in this disclosure, the angle of attack refers to the angle formed between a direction of motion relative to a reference line or plane.

Anterior: As used in this disclosure, anterior is a term that is used to refer to the front side or direction of a structure. When comparing two objects, the anterior object is the object that is closer to the front of the structure.

Arc: As used in this disclosure, an arc refers to a portion of a circumference or a curved perimeter. When applied to an angle, the arc also refers to a measure of an angular span as measured from a circle at the vertex formed by the sides of the angle.

Battery: As used in this disclosure, a battery is a chemical device consisting of one or more cells, in which chemical energy is converted into electricity and used as a source of power. Batteries are commonly defined with a positive terminal and a negative terminal.

Blade: As used in this disclosure, a blade is a term that is used to describe: 1) a wide and flat portion of a structure; or, 2) the cutting edge of a tool.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clockwise: As used in this disclosure, clockwise refers to a direction of rotation as it appears to a viewer. The clockwise direction is defined as the rotational direction that is opposite to the counterclockwise direction.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Counterclockwise: As used in this disclosure, counterclockwise refers to a direction of rotation as it appears to a viewer. The counterclockwise direction is defined using a right hand rule. Specifically, when the viewer: 1) puts their right hand between the rotating object and themselves; and, 2) from this position points the thumb of their right hand directly at themselves; then, 3) when the viewer rotates their wrist, the fingers of the right hand will rotate in the counterclockwise direction.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electronic Lock: As used in this disclosure, an electronic lock is an electromechanically operated lock that: 1) mechanically locks an object; and, 2) is secured and released using an electrical or electronically driven mechanism.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Key: As used in this disclosure, a key is a metal tool used to open and secure a lock. The working element of the key is a blade structure into which is cut a series of ridges and notches in a pattern customized for the lock that is paired for use with the key.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed is viewed from posterior side towards the anterior side. The right side of any object is the same side as the right side of the human body when the object is viewed is viewed from posterior side towards the anterior side. The left and right sides of the object remain unchanged by changes to the direction from which the object is viewed.

Lock: As used in this disclosure, a lock is a fastening device that is released through the use of a key, a numeric or alphanumeric combination, or a biometric identification protocol.

Logic Circuit: As used in this disclosure, a logic circuit is non-programmable electrical device that receives one or more digital or analog inputs and uses those digital or analog inputs to generate one or more digital or analog outputs.

Maintained Switch: A used in this disclosure, a maintained switch is a switch that maintains the position that was set in the most recent switch actuation. A maintained switch works in an opposite manner to a momentary switch.

Major and Minor Axes: As used in this disclosure, the major and minor axes refer to a pair of perpendicular axes that are defined within a structure. The length of the major axis is always greater than or equal to the length of the minor axis. The major axis is always the longest diameter of the structure. The major and minor axes intersect at the center of the structure. The major axis is always parallel to the longest edge of a rectangular structure.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the “normal” position. For example, a “normally open” momentary switch interrupts (open) the electric circuit in the baseline position and completes (closes) the circuit when the momentary switch is activated. Similarly, a “normally closed” momentary switch will complete (close) an electric circuit in the baseline position and interrupt (open) the circuit when the momentary switch is activated.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

Perimeter: As used in this disclosure, a perimeter is one or more curved or straight lines that bounds an enclosed area on a plane or surface. The perimeter of a circle is commonly referred to as a circumference.

Posterior: As used in this disclosure, posterior is a term that is used to refer to the side of an object that is distal or in the opposite direction of the anterior side. When comparing two items, the posterior item is the item that is distal from the anterior of the object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Such As: As used in this disclosure, the term “such as” is a conjunction that relates a first phrase to a subsequent phrase. The term “such as” is used to introduce representative examples of structures that meet the requirements of the first phrase. As a first example of the use of the term “such as,” the phrase: “the first textile attaches to the second textile using a fastener such as a hook and loop fastener” is taken to mean that a hook and loop fastener is suitable to use as the fastener but is not meant to exclude the use of a zipper or a sewn seam. As a second example of the use of the term “such as,” the phrase: “the chemical substance is a halogen such as chlorine or bromine” is taken to mean that either chlorine or bromine are suitable for use as the halogen but is not meant to exclude the use of fluorine or iodine.

Such That: As used in this disclosure, the term “such that” is a conjunction that relates a first phrase to a subsequent phrase. The term “such that” is used to place a further limitation or requirement to the first phrase. As a first example of the use of the term “such that,” the phrase: “the door attaches to the wall such that the door rotates relative to the wall” requires that the attachment of the door allows for this rotation. As a second example of the use of the term “such that,” the phrase: “the chemical substance is selected such that the chemical substance is soluble in water” requires that the selected chemical substance is soluble in water. As a third example of the use of the term “such that,” the phrase: “the lamp circuit is constructed such that the lamp circuit illuminates when the lamp circuit detects darkness” requires that the lamp circuit: a) detect the darkness; and, b) generate the illumination when the darkness is detected.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Tool: As used in this disclosure, a tool is a device, an apparatus, or an instrument that is used to carry out an activity, operation, or procedure.

Tradition: As used in this disclosure, a tradition refers to: 1) a set of thoughts or expectations regarding a subject or object; or, 2) a method of using an object; that, 3) is perceived to be widely or commonly shared across a population of people; and that, 4) is perceived to be widely or commonly shared across at least two generations within the population of people.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 10 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A security device comprising a key structure, a locking structure, and a lock control circuit;

wherein the key structure inserts into the locking structure;

wherein the key structure controls the operation of the lock control circuit;

wherein the lock control circuit controls the operation of the locking structure;

wherein the lock body further comprises a first arm blade slot, a second arm blade slot, and a master blade slot;

wherein the first arm blade slot is a negative space formed within a slotted structure of the locking structure;

wherein the first arm blade slot forms the space that the first arm blade rotates into after the first arm blade has been released from a master blade;

wherein the second arm blade slot is a negative space formed within the slotted structure of the locking structure;

wherein the second arm blade slot forms the space that the second arm blade rotates into after the second arm blade has been released from the master blade;

wherein the master blade slot is a negative space formed within the slotted structure of the locking structure;

wherein the master blade slot forms the space that the master blade inserts into when the key structure inserts into the locking structure.

2. The security device according to claim 1 wherein the locking structure is a fastening device;

wherein the locking structure secures the position of a first object relative to a second object;

wherein the locking structure is a releasable structure such that the position of the first object relative to the second object can be adjusted after the locking structure is released;

wherein the lock control circuit is an electric circuit;

wherein the lock control circuit forms an electronic locking mechanism that fastens and releases the locking structure;

wherein the key structure is a multi-blade structure that controls the operation of the lock control circuit.

3. The security device according to claim 2 wherein the key structure is a mechanical structure;

wherein the key structure controls the operation of the lock control circuit;

wherein the key structure inserts into the locking structure;

wherein the key structure is a rotating structure;

wherein by rotating structure is meant that the cant formed between any two blades selected from the multi-blade structure of the key structure is adjustable;

wherein by cant is meant the arc formed between the major axis of any blade initially selected from the multi-blade structure of the key structure and the major axis of any blade subsequently selected from the multi-blade structure of the key structure;

wherein the locking structure is constructed such that the rotation of the multi-blade structure occurs while the key structure is inserted in the locking structure.

4. The security device according to claim 3 wherein each blade selected from the multi-blade structure of the key structure is a toothed structure;

wherein by toothed structure is meant that each blade selected from the multi-blade structure is formed with a series of ridges and grooves that are individualized to the selected blade;

wherein the toothed structure of each blade selected from the multi-blade structure interacts with the lock control circuit in a manner that is similar to the way a traditional lock key interacts with the tumblers of a traditional lock;

wherein the lock control circuit simultaneously measures the toothed structure of each blade selected from the multi-blade structure of the key structure to identify whether the key structure is authorized to release the locking structure.

5. The security device according to claim 4 wherein the locking structure is a fastening structure;

wherein the locking structure secures the first object to the second object such that the first object remains in a fixed position relative to the second object;

wherein the locking structure is a releasable structure such that the first object can subsequently move relative to the second object after the locking structure has been released;

wherein the form factor of the locking structure is selected such that the key structure: a) can insert into the locking structure; and, b) the rotation of the multi-blade structure of the key structure can occur while the key structure is inserted into the locking structure.

6. The security device according to claim 5 wherein the lock control circuit mounts in the locking structure;

wherein the lock control circuit controls the operation of the locking structure;

wherein by controlling the operation of the locking structure is meant that: a) the lock control circuit locks the locking structure into a state such that the position of the first object remains fixed relative to the second object; and, b) the lock control circuit releases the locking structure into a state such that the first object can subsequently move relative to the second object;
wherein the lock control circuit is the electric circuit;
wherein the lock control circuit controls the operation of the locking structure;
wherein the lock control circuit interacts with the toothed structure of each blade selected from the multi-blade structure of the key structure;
wherein the lock control circuit releases the locking structure when the lock control circuit identifies the key structure as being authorized to release the locking structure.

7. The security device according to claim 6
wherein the key structure comprises a first arm blade, a second arm blade, a master blade, and a key bow;
wherein the key bow is a grip that attaches to the lateral face of the master blade;
wherein the first arm blade attaches to the master blade such that the first arm blade rotates relative to the master blade;
wherein the second arm blade attaches to the master blade such that the second arm blade rotates relative to the master blade;
wherein the second arm blade attaches to the master blade such that the second arm blade rotates relative to the first arm blade.

8. The security device according to claim 7
wherein the locking structure comprises a lock body and a bolt structure;
wherein the lock body is a solid rigid structure;
wherein the lock body is formed with the mass necessary to allow the lock body to be considered a bullet resistant structure;
wherein the lock body houses the bolt structure and the lock control circuit;
wherein the interior of the lock body is formed with a slotted structure;
wherein the slotted structure is a negative space that is formed in the lock body;
wherein the form factor of the slotted structure formed within in the lock body allows for the insertion of the master blade of the key structure into the locking structure;
wherein the form factor of the slotted structure formed within in the lock body allows for the rotation of the first arm blade away from the master blade after the master blade is fully inserted into the locking structure;
wherein the form factor of the slotted structure formed within in the lock body allows for the rotation of the second arm blade away from the master blade after the master blade is fully inserted into the locking structure.

9. The security device according to claim 8
wherein the lock control circuit further comprises a logic circuit and an electronic lock mechanism;
wherein the logic circuit is an electric circuit;
wherein the logic circuit controls the operation of the locking structure;
wherein the logic circuit monitors the locking structure to determine if the key structure is inserted into the locking structure;
wherein the logic circuit identifies that the key structure is authorized to release the locking structure;
wherein the logic circuit releases the lock on the locking structure when the authorized key structure is fully inserted into the locking structure;
wherein the logic circuit reestablishes the lock on the locking structure when the authorized key structure is removed from the locking structure;
wherein the electronic lock mechanism is an electric circuit;
wherein the electronic lock mechanism physically controls the position of the bolt structure relative to the locking structure;
wherein the logic circuit controls the operation of the electronic lock mechanism;
wherein when the logic circuit identifies that an authorized key is inserted into the locking structure, the logic circuit sets the electronic lock mechanism into a state that allows the bolt structure to move relative to the lock body;
wherein when the logic circuit identifies that an authorized key is not inserted into the locking structure, the logic circuit sets the electronic lock mechanism into a state that locks the bolt structure into a fixed position relative to the lock body.

10. The security device according to claim 9
wherein the lock control circuit further comprises a plurality of microswitches;
wherein each of the plurality of microswitches is an electric switch;
wherein each of the plurality of microswitches is a momentary switch;
wherein each of the plurality of microswitches mounts in the slotted structure formed in the locking structure;
wherein each microswitch selected from the plurality of microswitches is positioned in the slotted structure of the locking structure such that each selected microswitch interacts with the toothed structure of a blade selected from the multi-blade structure of the key structure;
wherein each microswitch selected from the plurality of microswitches presses against the toothed structure of the blade selected from the multi-blade structure such that the movement of the selected blade past the selected microswitch moves the position of the selected microswitch such that the microswitch is actuated by the toothed structure;
wherein the logic circuit monitors the actuation of each of the plurality of microswitches;
wherein the specific actuations of each of the plurality of microswitches by the toothed structures of the multi-blade structure is used by the lock control circuit to identify that the inserted key structure is authorized to release the locking structure.

11. The security device according to claim 10
wherein the first arm blade is a disk-shaped structure;
wherein the first arm blade further comprises a first arm blade toothed structure;
wherein the first arm blade toothed structure is series of ridges and grooves that are formed in the lateral face of the disk structure of the first arm blade;
wherein the specific structure of the ridges and grooves that form the first arm blade toothed structure are individualized to the first arm blade such that the structure of the first arm blade toothed structure is different from the structure of the second arm blade toothed structure;
wherein the specific structure of the ridges and grooves that form the first arm blade toothed structure are individualized to the first arm blade such that the structure of the first arm blade toothed structure is different from the structure of the master blade toothed structure;

wherein the specific structure of the ridges and grooves that form the first arm blade toothed structure are individualized to the first arm blade such that the structure of the first arm blade toothed structure of any first instantiation of the key structure is different from the specific structure of the ridges and grooves that form the first arm blade toothed structure of any second instantiation of the key structure.

12. The security device according to claim 11 wherein the second arm blade is a disk-shaped structure;

wherein the second arm blade further comprises a second arm blade toothed structure;

wherein the second arm blade toothed structure is series of ridges and grooves that are formed in the lateral face of the disk structure of the second arm blade;

wherein the specific structure of the ridges and grooves that form the second arm blade toothed structure are individualized to the second arm blade such that the structure of the second arm blade toothed structure is different from the structure of the first arm blade toothed structure;

wherein the specific structure of the ridges and grooves that form the second arm blade toothed structure are individualized to the second arm blade such that the structure of the second arm blade toothed structure is different from the structure of the master blade toothed structure;

wherein the specific structure of the ridges and grooves that form the second arm blade toothed structure are individualized to the second arm blade such that the structure of the second arm blade toothed structure of any first instantiation of the key structure is different from the specific structure of the ridges and grooves that form the second arm blade toothed structure of any second instantiation of the key structure.

13. The security device according to claim 12 wherein the master blade is a disk-shaped structure;

wherein the master blade further comprises a master blade toothed structure and a hinge structure;

wherein the master blade toothed structure is series of ridges and grooves that are formed in the lateral face of the disk structure of the master blade;

wherein the specific structure of the ridges and grooves that form the master blade toothed structure are individualized to the master blade such that the structure of the master blade toothed structure is different from the structure of the first arm blade toothed structure;

wherein the specific structure of the ridges and grooves that form the master blade toothed structure are individualized to the master blade such that the structure of the master blade toothed structure is different from the structure of the second arm blade toothed structure;

wherein the specific structure of the ridges and grooves that form the master blade toothed structure are individualized to the master blade such that the structure of the master blade toothed structure of any first instantiation of the key structure is different from the specific structure of the ridges and grooves that form the master blade toothed structure of any second instantiation of the key structure.

14. The security device according to claim 13 wherein the master blade forms a hollow storage structure that contains the first arm blade and the second arm blade;

wherein the first arm blade and the second arm blade are rotated into the hollow storage structure of the master blade as the master blade of the key structure inserts into the locking structure;

wherein the master blade interacts with the lock control circuit once the master blade is fully inserted into the locking structure;

wherein the first arm blade rotates away from the master blade after the master blade is fully inserted into the locking structure;

wherein the first arm blade rotates away from the master blade into a position that allows the first arm blade to interact with the lock control circuit;

wherein the second arm blade rotates away from the master blade after the master blade is fully inserted into the locking structure;

wherein the second arm blade rotates away from the master blade into a position that allows the second arm blade to interact with the lock control circuit;

wherein the second arm blade rotates away from the master blade in the direction opposite to the direction of rotation of the first arm blade;

wherein by the direction opposite to the direction of rotation of the first arm blade is meant that: a) second arm blade will rotate in the counterclockwise direction if the first arm blade rotates in the clockwise direction; and, b) the second arm blade will rotate in the clockwise direction if the first arm blade rotates in the counterclockwise direction;

wherein the first arm blade rotates back into the hollow storage structure of the master blade as the key structure is removed from the locking structure;

wherein the second arm blade rotates back into the hollow storage structure of the master blade as the key structure is removed from the locking structure.

15. The security device according to claim 14 wherein the hinge structure is a mechanical structure;

wherein the hinge structure attaches the first arm blade to the master blade such that the first arm blade rotates relative to the master blade;

wherein the hinge structure latches the first arm blade into a position within the hollow storage structure of the master blade;

wherein the hinge structure releases the first arm blade from its position in the hollow interior of the master blade such that the hinge structure can rotate into the first arm blade slot after the key structure is fully inserted into the locking structure;

wherein the walls of the master blade slot press against the first arm blade as the key structure is removed from the locking structure such that the first arm blade is reinserted into the hollow storage structure of the master blade;

wherein the hinge structure relatches the first arm blade into position after the first arm blade is reinserted into the hollow storage structure of the master blade;

wherein the hinge structure attaches the second arm blade to the master blade such that the second arm blade rotates relative to the master blade;

wherein the hinge structure latches the second arm blade into a position within the hollow storage structure of the master blade;

wherein the hinge structure releases the second arm blade from its position in the hollow interior of the master blade such that the hinge structure can rotate into the second arm blade slot after the key structure is fully inserted into the locking structure;

wherein the walls of the master blade slot press against the second arm blade as the key structure is removed from the locking structure such that the second arm blade is reinserted into the hollow storage structure of the master blade;

wherein the hinge structure relatches the second arm blade into position after the second arm blade is reinserted into the hollow storage structure of the master blade.

16. The security device according to claim 15 wherein the bolt structure is the physical fastening device that secures the first object to the second object;

wherein the bolt structure physically attaches to the first object and the second object;

wherein the bolt structure fixes the position of the first object relative to the second object when the lock control circuit locks the bolt structure into a fixed position relative to the locking structure;

wherein the bolt structure releases the lock on the position of the first object relative to the second object when the lock control circuit releases the lock on the position of the bolt structure relative to the locking structure.

17. The security device according to claim 16 wherein the plurality of microswitches further comprises a first sub-plurality of microswitches, a second sub-plurality of microswitches, and a third sub-plurality of microswitches;

wherein the first sub-plurality of microswitches is a sub-plurality of microswitches selected from the plurality of microswitches;

wherein the first sub-plurality of microswitches mount in the first arm blade slot such that the first sub-plurality of microswitches interacts with the first arm blade toothed structure of the first arm blade;

wherein the second sub-plurality of microswitches is a sub-plurality of microswitches selected from the plurality of microswitches;

wherein the second sub-plurality of microswitches mount in the second arm blade slot such that the second sub-plurality of microswitches interacts with the second arm blade toothed structure of the second arm blade;

wherein the third sub-plurality of microswitches is a sub-plurality of microswitches selected from the plurality of microswitches;

wherein the third sub-plurality of microswitches mount in the master blade slot such that the third sub-plurality of microswitches interacts with the master blade toothed structure of the master blade.

18. The security device according to claim 17 wherein the hinge structure further comprises a hinge, a spring mechanism, and a spring latch mechanism;

wherein the hinge is a fastening structure;

wherein the hinge attaches the first arm blade to the master blade such that the first arm blade rotates relative to the master blade;

wherein the hinge attaches the second arm blade to the master blade such that the second arm blade rotates relative to the master blade;

wherein the spring mechanism is a mechanical structure;

wherein the spring mechanism attaches to the first arm blade and the second arm blade;

wherein the spring mechanism provides the motive forces that rotate the first arm blade away from the master blade when the key structure fully inserts into the locking structure;

wherein the spring mechanism provides the motive forces that rotate the second arm blade away from the master blade when the key structure fully inserts into the locking structure;

wherein the spring latch mechanism is a mechanical structure;

wherein the spring latch mechanism controls the rotation of the first arm blade relative to the master blade;

wherein the spring latch mechanism controls the rotation of the second arm blade relative to the master blade;

wherein the spring latch mechanism locks the first arm blade into a fixed position within the hollow storage structure of the master blade until the key structure is fully inserted into the locking structure;

wherein the full insertion of the key structure into the locking structure releases the spring latch mechanism such that the first arm blade rotates into the first arm blade slot;

wherein the removal of the key structure from the locking structure resets the spring latch mechanism such that the spring latch mechanism relocks the first arm blade into position within the master blade;

wherein the spring latch mechanism locks the second arm blade into a fixed position within the hollow storage structure of the master blade until the key structure is fully inserted into the locking structure;

wherein the full insertion of the key structure into the locking structure releases the spring latch mechanism such that the second arm blade rotates into the second arm blade slot;

wherein the removal of the key structure from the locking structure resets the spring latch mechanism such that the spring latch mechanism relocks the second arm blade into position within the master blade.

* * * * *